US007698433B2

(12) United States Patent
Gallant

(10) Patent No.: US 7,698,433 B2

(45) Date of Patent: Apr. 13, 2010

(54) USER ALIASES IN COMMUNICATION SYSTEM

(75) Inventor: John Kenneth Gallant, Plano, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 928 days.

(21) Appl. No.: 10/101,389

(22) Filed: Mar. 16, 2002

(65) Prior Publication Data

US 2002/0165969 A1 Nov. 7, 2002

Related U.S. Application Data

(60) Provisional application No. 60/276,923, filed on Mar. 20, 2001, provisional application No. 60/276,953, filed on Mar. 20, 2001, provisional application No. 60/276,955, filed on Mar. 20, 2001, provisional application No. 60/276,954, filed on Mar. 20, 2001.

(51) Int. Cl.
*G06F 15/16* (2006.01)

(52) U.S. Cl. ....................... 709/227; 709/201; 709/204; 709/230; 709/245

(58) Field of Classification Search ................. 709/201, 709/205, 227, 230, 245; 711/202
See application file for complete search history.

(56) References Cited

U.S. PATENT DOCUMENTS

| | | | | |
|---|---|---|---|---|
| 5,633,484 | A | 5/1997 | Zancho et al. | |
| 6,108,712 | A | 8/2000 | Hayes, Jr. | |
| 6,167,449 | A * | 12/2000 | Arnold et al. | 709/227 |
| 6,185,567 | B1 | 2/2001 | Ratnaraj et al. | |
| 6,240,449 | B1 * | 5/2001 | Nadeau | 709/223 |
| 6,275,574 | B1 * | 8/2001 | Oran | 379/201.01 |
| 6,564,261 | B1 * | 5/2003 | Gudjonsson et al. | 709/227 |
| 6,681,252 | B1 * | 1/2004 | Schuster et al. | 709/227 |
| 6,836,805 | B1 * | 12/2004 | Cook | 709/245 |
| 6,883,023 | B1 * | 4/2005 | Wang et al. | 709/220 |
| 6,888,803 | B1 * | 5/2005 | Gentry et al. | 370/259 |
| 6,938,080 | B1 * | 8/2005 | Kahveci et al. | 709/223 |
| 2002/0120760 | A1 * | 8/2002 | Kimchi et al. | 709/230 |

OTHER PUBLICATIONS

Schulzrinne et al., "SIP Call Control Services", Internet Engineering Task Force, Internet Draft, Jun. 17, 1999.
Falstrom, P., "E.164 Number and DSN", Internet Engineering Task Force, Request for Comments 2916, Sep. 2000.
Schulzrinne et al., "RTP: A Transport Protocol for Real-Time Applications", Internet Engineering Task Force, Request for Comments 1889, Jan. 1996.
Handley et al., "SIP: Session Initiation Protocol", Internet Engineering Task Force, Request for Comment 2543, Mar. 1999.

* cited by examiner

*Primary Examiner*—Michael Won

(57) ABSTRACT

A technique is disclosed in the context of a communications system whereby parties accessible through the system may be referenced by multiple alternative symbolic names. User profile information for a given party may be maintained in the system to control features and routing behavior in response to session request involing the party. By virtue of a mapping capability, one or more symbolic names may be associated with the same user profile information. A session request involving any of the alternative names for a party will evoke the same user profile.

6 Claims, 5 Drawing Sheets

100
SIP CONFERENCING PLATFORM
127
VOICE MAIL SYSTEM
129
PROXY SERVER
113
OSS
121
LOCATION SERVER
115
DAL GATEWAY
105
PACKET NETWORK
101
109
111
118
ENTERPRISE GATEWAY
103
PBX
117
NETWORK GATEWAY
107
LEGACY INTELLIGENT NETWORK
119
PSTN
123
125

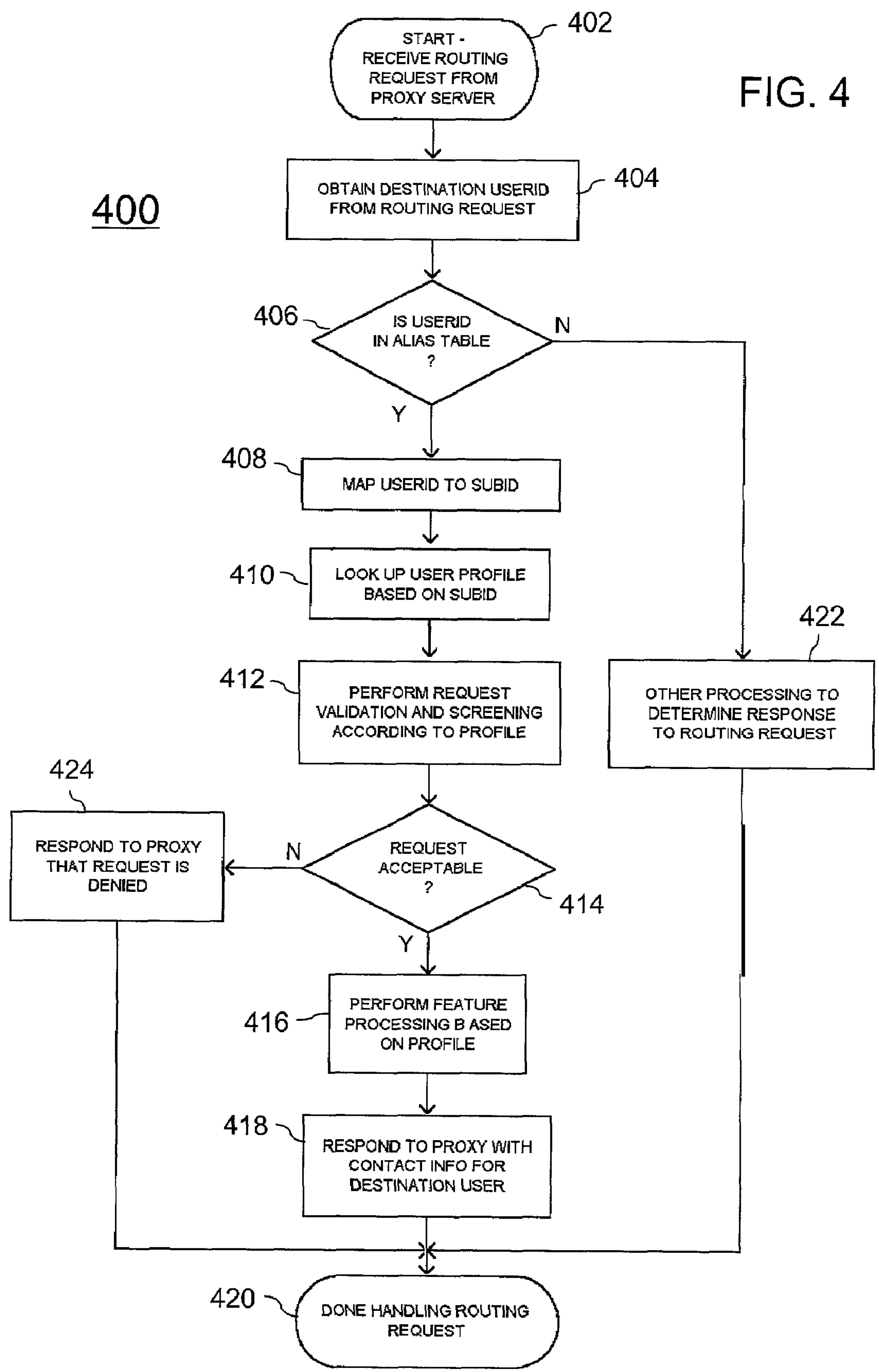

400
402
START - RECEIVE ROUTING REQUEST FROM PROXY SERVER
FIG. 4
404
OBTAIN DESTINATION USERID FROM ROUTING REQUEST
406
IS USERID IN ALIAS TABLE ?
N
Y
408
MAP USERID TO SUBID
410
LOOK UP USER PROFILE BASED ON SUBID
422
412
PERFORM REQUEST VALIDATION AND SCREENING ACCORDING TO PROFILE
OTHER PROCESSING TO DETERMINE RESPONSE TO ROUTING REQUEST
424
RESPOND TO PROXY THAT REQUEST IS DENIED
N
REQUEST ACCEPTABLE ?
414
Y
416
PERFORM FEATURE PROCESSING B ASED ON PROFILE
418
RESPOND TO PROXY WITH CONTACT INFO FOR DESTINATION USER
420
DONE HANDLING ROUTING REQUEST

USER ALIASES IN COMMUNICATION SYSTEM

RELATED APPLICATIONS

This application is related to, and claims the benefit of the earlier filing date under 35 U.S.C. § 119(e) of, U.S. Provisional Patent Application No. 60/276,923, filed Mar. 20, 2001, entitled "IP Communications," U.S. Provisional Patent Application No. 60/276,953, filed Mar. 20, 2001, entitled "IP Communications," U.S. Provisional Patent Application No. 60/276,955, filed Mar. 20, 2001, entitled "IP Communications," and U.S. Provisional Patent Application No. 60/276,954, filed Mar. 20, 2001, entitled "IP Communications"; the entireties of which are incorporated herein by reference.

FIELD OF THE INVENTION

The present invention relates to a communications system, and is more particularly related to resolution of user identities for establishing communications sessions.

BACKGROUND

The proliferation of data transport networks, most notably the Internet, is causing a revolution in telephony and other forms of real-time communication. Businesses that have been accustomed to having telephony traffic and data traffic separately supported over different systems and networks are now moving towards so-called "converged networks" wherein telephone voice traffic and other forms of real-time media are converted into digital form and carried by a packet data network along with other forms of data. Now that the technologies are feasible to support it, voice over data transport offers many advantages in terms of reduced capital and operating costs, resource efficiency and flexibility.

For example, at commercial installations, customer premise equipment investments and operating costs may be substantially reduced as most of the enhanced functions, such as PBX and automatic call distribution functions, may reside in a service provider's network. Various types of gateways allow for sessions to be established even among diverse systems such as IP phones, conventional analog phones and PBXs as well as with networked desktop computers.

Thus, the field of telephony is turning away from the traditional use of circuit switches operating under stored program control or under the control of industry standardized intelligent network (IN) call processing. Instead, new service processing architectures (such as the so-called "softswitch" approach) and protocols (like the Session Initiation Protocol or 'SIP') have arisen, significantly patterned upon techniques developed for the Internet and other data networks.

Aside from cost considerations, a significant advantage and motivation for this change in service processing is the promise of enhanced new services and faster deployment of services. New packet-switched telephony networks, coupled with the aforementioned new service processing paradigms, are being designed to offer users unprecedented levels of flexibility and customizability.

Even at the periphery of the network, a new generation of end user terminal devices are now replacing the traditional telephones and even the more recent PBX phone sets. These new sets, such as those offered by Cisco Systems, Inc. and Pingtel Corporation, may connect directly to a common data network, via an Ethernet connection for example, and feature large visual displays to enhance the richness of the user interface.

Another significant sign of radical departure from traditional telephony relates to the manner in which destinations are expressed. Rather than using the familiar telephone number to place a call to a particular telephone station, the new paradigm relies upon identifying a party whom one is trying to reach, independent of any particular location or station address (such as a telephone number). The current trend is that this identification is alphanumeric and resembles an e-mail address or URI(universal resourse identifier) as is now commonly used in other types of communication. The new phones described above can "dial" such alphanumeric addresses.

This technique of specifying a party rather than a station ties into another novel aspect of packet-switched telephony, namely that user location is allowed to be very dynamic. By default, a given user may be associated with a particular communications terminal (telephone, mobile phone, pager, etc.) in the traditional sense. In addition, the user may approach one of the newer types of IP phone appliances and register his presence to receive calls at the given phone. Any inbound calls will then go to the most recently registered address. Given this mobility, the identification scheme for destination parties must be decoupled from the addressing of specific terminals. Soon the familiar practice of memorizing a "telephone number" may be obsoleted, or at least supplemented, by alternative symbolic expressions for specifying a given destination party, also known as a "terminating" party.

SUMMARY

The traditional use of telephone numbers to reach specific telephone numbers is poorly suited to specifying a desired destination party in a communications system, especially if the party may dynamically move about from one location to another. A prior art technique is known for providing a single number by which to reach a given person. However, this "one number" approach requires a caller, also referred to as the "originating" party, to be familiar with a cryptic number without even the slight benefit of the geographical significance that most conventional telephone numbers have. Furthermore, existing single number services that have been implemented in traditional telephony networks are not dynamically configurable to track a user's whereabouts in real time.

Another disadvantage of prior art approaches is the inability to offer a variety of address types that all resolve to a single profile. This becomes especially important in an integrated communications system wherein many types of communications types are supported, including real-time media such as voice, video, conferencing, and collaborative applications alongside other data traffic. It is in the new context of an integrated network that a variety of address types are apt to come into play.

There are other practical reasons for supporting multiple address types. Traditional telephony and the newer control and transport schemes will likely coexist for a period of time. Abruptly transitioning a system or a subscriber from having a traditional telephone number to having only a URI or the like is unnecessarily disruptive. The ability to accommodate both forms of addressing fits well with a gradual transitioning of both the network infrastructure and of the user population, allowing people to use familiar telephone numbers even as other forms of addressing become available.

In accordance with a preferred embodiment of the present invention, a session processing control system is employed wherein each user has a provisionable profile describing the feature settings that control how the network handles calls on behalf of the user. Such configurable features may include call forwarding, call screening, and find-me contact lists, for example.

A symbol in a data processing system, such as character string, which specifies a destination user is mapped to the appropriate profile for the destination user. In response to a request by someone to establish a session with the destination party, the session processing functions are able to access the profile indicated by the character string and perform processing to establish the session using the network resources. This processing may include carrying out call handling features, authenticating users, validating the request, and determining recent whereabouts of the destination party. Much of this processing is affected by the contents of user profiles.

In accordance with a preferred embodiment, a resolving function (or a simple look-up table) for matching character strings to user profiles may accommodate a variety of formats for the character string. Put simply, the character string may take a variety of forms, including such things as public or private phone numbers, numeric IP addresses like 166.78.32.3, or DNS-resolvable names like "john.doe@thiscompany.com."

Of particular significance is the aspect that, by using a table to map this variety of forms to a particular user, it is also possible for many character strings to map to the same profile. When there is a multiplicity of characters strings that are mapped to a single profile, the character strings are each said to be an "alias" with respect to the user associated with the profile.

There are numerous advantages to providing aliases. One advantage stems from the fact that various callers, or systems used by callers, may be amenable to different ones of these formats. To better accommodate such circumstances, a destination might have, for example, one alias that is a simple and intuitive text name (Jack.Horner@Storybook.org) to facilitate human input or e-mail-like interfaces, and a second alias as an IP address (like 134.244.12.45) to facilitate access through machine interfaces. For example, the latter alias may be preferred for compactness or consistency of format, which may be qualities important for some devices.

Another advantage relates to the ability to partition one's accessibility to others. By selectively making different aliases known to different people, handling of inbound calls may be differentiated. Handling may be changed for entire groups of inbound call types. For example, a person or a business enterprise or even a public-facing entity such as radio or television station or public official, may chose to publish and use one alias for a period of time and/or for a specific purpose. At a later time, such an entity may decide to withdraw or disable the published address. Alternatively, one might reassociate the published address with a different profile or otherwise alter the handling of calls to the temporarily chosen address. Fortunately, by virtue of the present teachings, the enabling and disabling of this alias is easily done without having to obliterate the profile of the destination user. Nor is there any need to change the logical addresses (i.e. telephone numbers) of any of the terminal devices. The comparative ease of doing this may be contrasted to the effort and inconvenience involved in the traditional telephone network in the changing or removal of phone numbers and the uprooting of the user's feature set. This latter aspect has become considerably more important in light of the richness of user configurable features offered in the new networks.

Another unobvious advantage to providing aliases, even among similar address types, relates to providing the user the ability to differentiate addressing in other ways. It is conceivable that a senior business person may want to provide a contact address that conveys a business-like image, or at least a name intuitively associated with the business, such as "Alan.Stone@sandstone-architectural.com." With respect to family members and grandchildren, this same person may well want to use a more personal handle that is intuitive for family and friends, such as "grandpa.al@sandstone.office." Both of these references may call up the same person's profile, resulting in the ability of either type of calling party, business or family, to readily reach the person. Still other other aliases may be used in connection with organizational affiliations, hobbies, interests or other facets of the user's life. Aliases can be an important part of an overall system that makes users more reachable than ever due to find-me functions, visitor login, etc. It is also conceivable that some differentiation in call handling may be configured into the profile such that these different handles cause somewhat different call handling, routing or disposition, even in the context of a unified profile.

In accordance one aspect of the present invention, a method is provided for controlling the establishment of a communication session with a party comprising the steps of receiving a first user identification symbol specifying the party, mapping the first user identification symbol to an index identifying user profile information corresponding to the party, using the index to access the user profile information, and then controlling the establishment of the communication session as a function of the user profile information corresponding to the party. The teachings of the present invention also provide for a communication system supporting user aliases and a location server function responds to communications requests by mapping user identification symbols to user profile information. In yet another aspect, the present invention provides for an operations support system through which aliases may be provisioned in a communications system. Still other aspects, features, and advantages of the present invention will be readily apparent from the following detailed description, simply by illustrating a number of particular embodiments and implementations, including the best mode contemplated for carrying out the present invention. The present invention is also amenable to other different embodiments and its several details can be modified in various respects without departing from the spirit and scope of the present invention. Accordingly, the drawings and description that follow are to be regarded as illustrative in nature, rather than restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flowchart of a process for processing aliases in accordance with an exemplary embodiment of the present invention.

DETAILED DESCRIPTION OF EXEMPLARY EMBODIMENT

In the following description, well-known structures and devices may be shown in block diagram form or otherwise summarized in order to avoid unnecessarily obscuring the present invention. For the purposes of explanation, numerous specific details are set forth in order to provide a thorough understanding of the present invention. It should be understood however that the present invention may be practiced in a variety of ways beyond these specific details.

For example, although the present invention is discussed in the context of the Session Initiation Protocol (SIP) and an Internet Protocol (IP)-based network, one of ordinary skill in the art will recognize that the present invention may be generally applicable to other equivalent or analogous communication protocols or communications networks.

For establishing a communications session in a network, new protocols and control architectures have emerged. It is worth noting that these have been inspired by the migration to a voice over data but are not necessarily limited to such an environment. In some respects the protocols and control architectures described next may be used to establish calls through any form of transport.

Both the ITU H.323 standard and the IETF's Session Initiation Protocol (SIP) are examples of protocols which may be used for establishing a communications session among terminals connected to a network. The SIP protocol is described in IETF document RFC 2543 and its successors. Various architectures have been proposed in conjunction with these protocols with a common theme of having an address resolution function, referred to as a "location server," somewhere in the network to control features on behalf of users and to maintain current information on how to reach any destination party.

It should be understood throughout this disclosure that, although SIP-type messages are shown for convenience, any type of protocol or a mixture of such protocols may be applied in various parts of the overall system. In particular, the routing requests and responses between the proxy server and location server may strictly or loosely conform to SIP or some other standardized protocol, or may be proprietary in nature.

Figure 1:
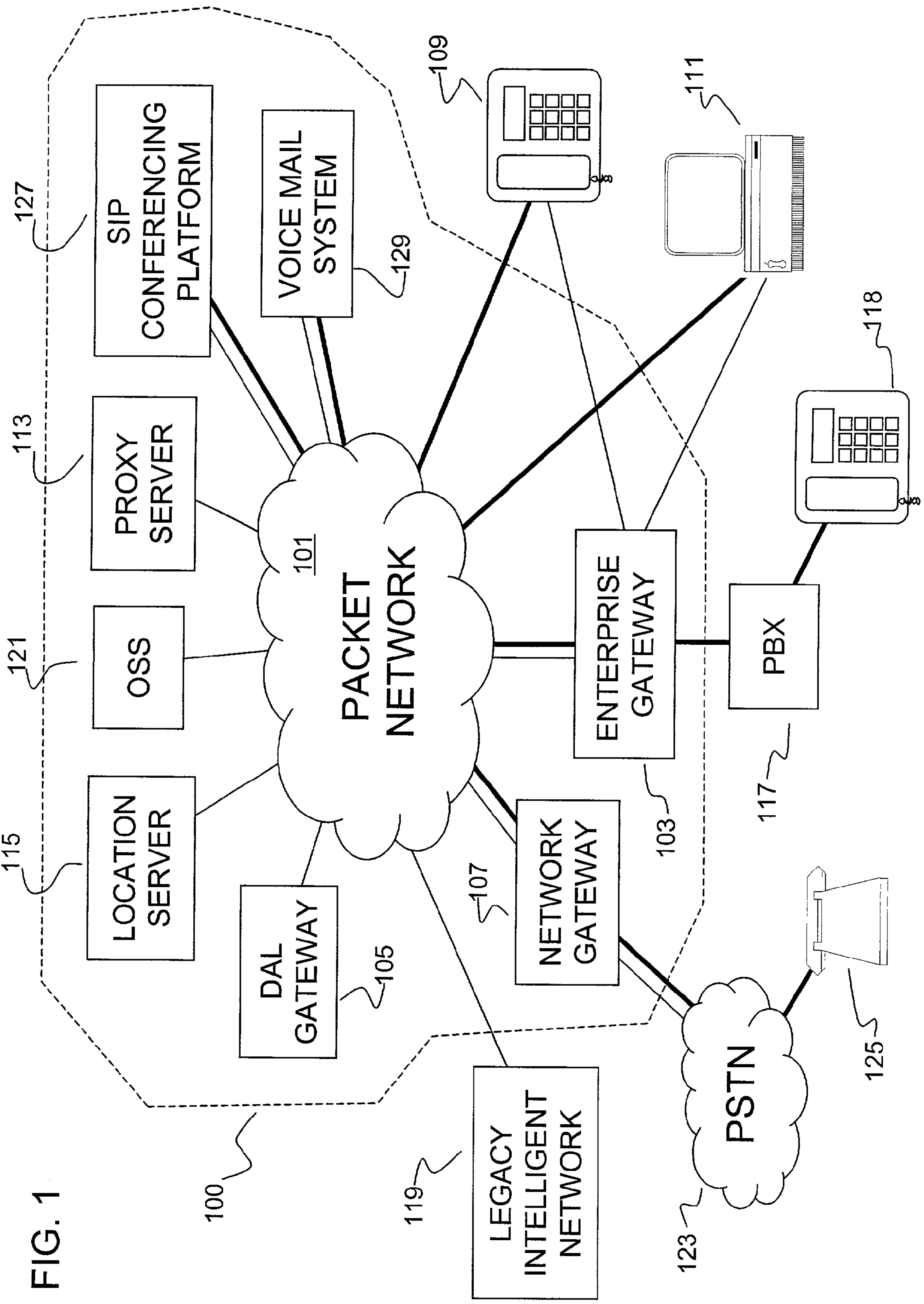
FIG. 1 is a diagram of a data communications system capable of supporting voice services, in accordance with an exemplary embodiment of the present invention.

FIG. 1 shows a diagram of a data communications system capable of supporting voice services, in accordance with an exemplary embodiment of the present invention. The communication system 100 includes a packet data transport network 101, which in an exemplary embodiment is an Internet Protocol (IP) based network. System 100 provides the ability to establish communications among various terminal equipment coupled thereto, such as telephone 125, PBX phone 118 and SIP phone 109. In practice, there may be thousands or millions of such terminal devices served by one or more systems 100.

As used herein, the term "SIP phone" refers to any client (e.g., a personal computer, a web-appliance, etc.) that is configured to provide SIP phone functionalities. The SIP phones 109 may take the form of standalone devices—e.g., a SIP phone may be designed and configured to function and appear like a Plain Old Telephone Service (POTS) telephone station. A SIP client 111, however, is a software client and may that run, for example, on a conventional personal computer (PC) or laptop computer. From a signaling perspective, these devices 109, 111 may operate quite similarly, with the main differences relating to the user interface. Unless otherwise stated, it is recognized that the functionalities of both the SIP phones 109 and the SIP client 111 are comparable and that the network operates similarly with either type of device.

The system 100 provides a number of elements to support the voice services, including an enterprise gateway 103, a Dedicated Access Line (DAL) gateway 105, a network gateway 107 and SIP conferencing platform 127. In particular, system 100 comprises the important elements of a proxy server 113 (also known as a network server (NS)) and a location server (LS) 115. Location server 115 serves as a repository for end user information to enable address validation, feature status, and real-time subscriber feature configuration. Additionally, LS 115 may store configuration information.

For the purposes of explanation, the capabilities of system 100 are described with respect to large enterprise users. It is noted that the feature/functionality of system 100 may be applicable to a variety of user types and communications needs. System 100 is able to support customers that maintain multiple locations with voice and data requirements.

As shown, enterprise gateway 103 provides connectivity from a PBX 117, which contains trunks or lines often for a single business customer or location (e.g., PBX phones 118). Signaling for calls from PBX 117 into the IP network comprises information which uniquely identifies the customer, trunk group, or carrier. This allows private numbers to be interpreted in their correct context. To interface to PBX 117, enterprise gateway 103 may use Integrated Digital Services Network (ISDN), Circuit Associated Signaling (CAS), or other PBX interfaces (e.g., European Telecommunications Standards Institute (ETSI) PRI, R2).

The Dedicated Access Line (DAL) gateway 105 is employed in system 100 to allow virtual private network (VPN) customers to be able to access their service even from a conventional telephone not served by the VPN.

Through system 100, communications may be established among the voice stations 125 that are serviced through the PSTN 123 and personal computers (e.g., PC 111) that are attached to packet data network 101.

Keeping in mind the similar nature of PC soft clients and standalone IP telephones, it maybe said that four possible scenarios exist with the placement of a voice over IP call: (1) phone-to-phone, (2) phone-to-PC, (3) PC-to-phone, and (4) PC-to-PC. In the first scenario of phone-to-phone call establishment, a call from the phone 125 is switched through PSTN 123 by a switch to the network gateway 107, which forwards the call through the IP backbone network 101. The packetized voice call is then routed through network 101, perhaps to another similar network gateway 107, to be at another PSTN phone (not shown). Under the second scenario, the phone 125 places a call to a PC through a switch to the PSTN 123. This voice call is then switched by the PSTN 123 to the SIP network gateway 107, which forwards the voice call to a PC 111 via the network 101. The third scenario involves a PC 111 that places a call to a voice station (e.g., phone 125). Using a voice encoder, the PC 111 introduces a stream of voice packets into the network 101 that are destined for the SIP network gateway 107. The SIP network gateway 107 converts the packetized voice information into a POTS electrical signal, which is circuit switched to the voice station (e.g., phone 125). Lastly, in the fourth scenario, a PC 111 establishes a voice call with another PC (not shown); in this case, packetized voice data is transmitted from the PC 111 via the network 101 to the other PC (not shown), where the packetized voice data is decoded.

As mentioned, system 100 may employ SIP to exchange session setup messages. Another popular session establishment protocol is referred to as the H.323 protocol, although it is actually a set of related protocols promulgated by the International Telecommunication Union (ITU) for accomplishing multimedia communication. SIP is an alternative standard that has been developed by the Internet Engineering Task Force (IETF). SIP is a signaling protocol that is based on a client-server model, generally meaning that clients invoke required services by messaging requests to servers that can provide the services. Similar to other IETF protocols (e.g., the simple mail transfer protocol (SMTP) and Hypertext Transfer Protocol (HTTP)), SIP is a textual, humanly readable protocol.

It may be noted that neither the H.323 or SIP protocols are limited to IP telephony applications, but have applicability to multimedia services in general. In one embodiment of the present invention, SIP is used to establish telephone calls and other types of sessions through system 100. However, it will be apparent to those of ordinary skill in the art that the H.323 protocol (with some modifications or extensions) or other similar protocols could be utilized instead of SIP. Separate from SIP, but often used in conjunction with SIP, is the Session Description Protocol (SDP), which provides information about media streams in the multimedia sessions to permit the recipients of the session description to participate in the session.

The Internet Engineering Task Force's SIP protocol defines numerous types of requests, which are also referred to as methods. An important method is the INVITE method, which invites a user to a conference. Another method is the BYE request, which indicates that the call may be released. In other words, BYE terminates a connection between two users or parties in a conference. Another method is the OPTIONS method. This method solicits information about capabilities without necessarily establishing a call. The REGISTER method may used to provide information to a SIP server about a user's present location.

Details regarding SIP and its call control services are described in IETF RFC 2543 and IETF Internet Draft "SIP Call Control Services", Jun. 17, 1999; both of these documents are incorporated herein by reference in their entireties.

Transmission of SIP messages can take place in an IP network through the well known User Datagram Protocol (UDP) or through the more reliable Transaction Control Protocol (TCP). Whereas SIP, H.323, or other protocols may be used to establish sessions through a data network, the actual media or "traffic" that is to be communicated among users may take place according to the well known Real-time Transport Protocol(RTP) as described in the IETF document RFC 1889.

It is likely, though not essential, that all of the call control signaling (SIP, H.323), media traffic(RTP/RTCP) and network management and provisioning will be communicated through common transport network 101. Thus, in FIG. 1, all of the elements appear in a hub arrangement around transport network 101.

In the traditional telephone network, calls are directed to specific locations or terminal devices uniquely identified by the called telephone number. In contrast, system 100 enables the caller to specify a called party to be reached independent of any particular location or terminal.

The user may move from one terminal to another and, at each terminal, may register as being present so that inbound calls are directed to the most recently registered location. Furthermore, a user may have both personal and group-wise profile settings that affect the activation of features, such as call blocking, even as a function of the time of day.

Because of the dynamic nature of user location and of call handling features, each request to establish a session is first routed to a proxy server so that user permissions may be verified, destination addresses may be found, and special features related to a user or a business may be applied to the call. Requests are serviced internally or by passing them on, possibly after translation, to other servers. A proxy interprets, and, if necessary, rewrites a request message before forwarding it.

In general, location server 115 accepts a routing request, such as from a proxy server, and determines addresses or "contacts" corresponding to the destination party expressed in the routing request. In response to the request, the location server may return a redirect response comprising contact information for the party. It is noted that messaging between NS 113 and LS 115 may use a modified version of SIP. For example, SIP acknowledge messages may be unnecessary between NS 113 and LS 115. Otherwise, messaging among network functions, such as NS 113 and LS 115, may use standard SIP or even non-SIP alternatives.

System 100 further includes an Operational Support Systems (OSS) 121 to provide provisioning, billing, and network management capabilities. OSS 121 may provide an environment or an interface, such as a web-based interface, for provisioning many aspects of dialing plans, user permissions and how features operate on behalf of each user. Many of these aspects are configured via OSS 121 by changing information within location servers or databases within system 100. Some specific features that may be configured by OSS 121 include legacy Centrex features such as Unconditional Call Forwarding, Conditional Call Forwarding, Call Blocking and Call Screening.

One feature that may be configured involves the so-called "Find-Me" service. A Find-Me schedule provides a mechanism to route calls using a list of possible destinations, wherein each destination is tried in turn. A Find-Me list may be specified to apply during a time-of-day or day-of-week or may be associated with different categories of calling numbers. Furthermore, a default Find-Me list might be provisioned to determine general handling when the more specific Find-Me lists are not in effect.

The possible destinations in a Find-Me list can be specific addresses associated with an account's profile. For instance, a specific cell-phone number or wire-line phone number can be a possible destination address. Furthermore, as a user registers their presence at a terminal, such as a SIP phone, the address of the terminal may be temporarily added to the Find-Me list.

For a SIP phone profile, the Find-Me list can contain specific destination addresses provisioned in the user profile, and/or a reference to current registered addresses. For a traditional phone behind an enterprise gateway profile, the Find-Me list can contain specific destination addresses provisioned in the user profile and/or a reference to the user's PBX-phone. The Find-Me list feature can be enabled for a user during account creation and then updated by the user. Entries made to the Find-Me list may be verified against the Feature Blocking List for the subscriber's dial plan. The user profile has a link to update the Find-Me list. Specifically, the system 100 allows the user to Create, Read, Update, and Delete an inventory of potential devices, which can be used for populating Find-Me listings.

OSS 121 provides the screens to collect and manage customer "Alias" to the LS 115. The aliases may be associated with a private phone number and/or URL addresses. The system 100 allows the user to create, read, update, and delete aliases associated with a private phone number and/or URL address. Valid address types include the following: private, public (E.164), and IP address.

The entry and maintenance of aliases are available only to the customer administrator (or account manager). The customer administrator (or account manager) will also have a management screen to view all customers' aliases through an alias management screen. Users are able to view their alias list, but preferably will not have the authority to update the entries. Aliases entered for private numbers are validated as part of the private numbers contained in the company's dial plan. This validation ensures that private numbers entered are "owned" by the subscribing company.

Handling of aliases for called parties is performed at the LS 115. Once a prefix rule is applied, the location server 115 can determine the type of the called party address—private, E.164, local, or non-phone-number IP address. The Subscriber ID table in the location server 115 is then consulted. If the called party appears in this table, then there is a pointer to the profile record for the called party. There can be multiple aliases pointing to the same profile.

A SIP phone can dial an alphanumeric URL.

For private numbers to terminate to a SIP phone, an alias is established for directing the call to the SIP device. In the case that a private number, which is INCP-based, is only reachable from the system 100, then the phone number range which within that number falls, needs to be provisioned in the INCP, pointing to the TSID/TTG of a DAL gateway 105 for that customer. If the private phone number is reachable from both the Class-3 network and from the system 100, then there may be no provisioning added to the INCP, and calls from the PSTN 123 to these numbers will complete using the PSTN 123 without reaching the system 100.

In an exemplary embodiment, individual users are not permitted to administer their own aliases. Thus, a designated administrator (whether a customer administrator or an administrator of the service provider) needs to perform this function on behalf of the users, thereby protecting against fraud.

In OSS 121, a user interface is provided to support calls dialed via a SIP URL, including screens that create customer profiles and manage alias names. The entry and maintenance of aliases may be made available only to the customer administrator (or account manager). The customer administrator (or account manager) also is provided with a management screen to view all customers' aliases, providing management of alias during an NPA split, for example.

When a call comes from a Local Gateway, the location server 115 needs to apply the appropriate prefix plan, and then route the call. The most direct method to accomplish this is to establish an E.164 alias pointing to the correct profile. Since calls from local gateways arrive as full E.164 numbers, the lookup of the E.164 number will locate the correct profile, which will in turn route the call to the proper destination.

The call processing network to route calls from the PSTN 123 to the system 100, the incoming phone number is associated with a device or a subscriber. This can be accomplished using the OSS screens that establish a profile for a PBX phone 118, or build prefix plans and alias lists for SIP devices. Through an alias list, individual public E.164 numbers may be associated with a profile. Alternatively, a prefix plan is created that maps a public number to a private number. An incoming dial string of 319.375.xxxx via the prefix plan may be converted to a private number through 820.xxxx; this converts a large block at a time.

SIP phones 109 allow users to register and de-register, or to "log in" and "log out", from the phone. In an exemplary embodiment, to provide mobility, SIP phones 109 permit usernames and passwords to be entered for visitors. By logging in, incoming calls to the visitor's profile are directed to the phone. When a visitor logs in, SIP phones 109 register the visitor with the Network Server 113 and Location Server 115. Any incoming call to any of the profiles registered by the phone can be directed to the phone. The Network Server 113 and Location Server 115 logic may use the name and password obtained through an authentication challenge to ensure that the registration is allowed. Network Server 113 and Location Server 115 may respond similarly to both situations where a user is logged in as a visitor or where the user is logged in to their usual home device, if there is one.

With respect to E.164 and DNS addressing, SIP phones 109 may support ENUM (Electronic Number) service, which is be used to route calls that originate in the IP domain or with ENUM-enabled networks. ENUM service is detailed in IETF RFC 2916, entitled "ENUM", which is incorporated herein by reference in its entirety. The SIP phones 109 may also support LINCP for client-based directory lookup.

Figure 2:
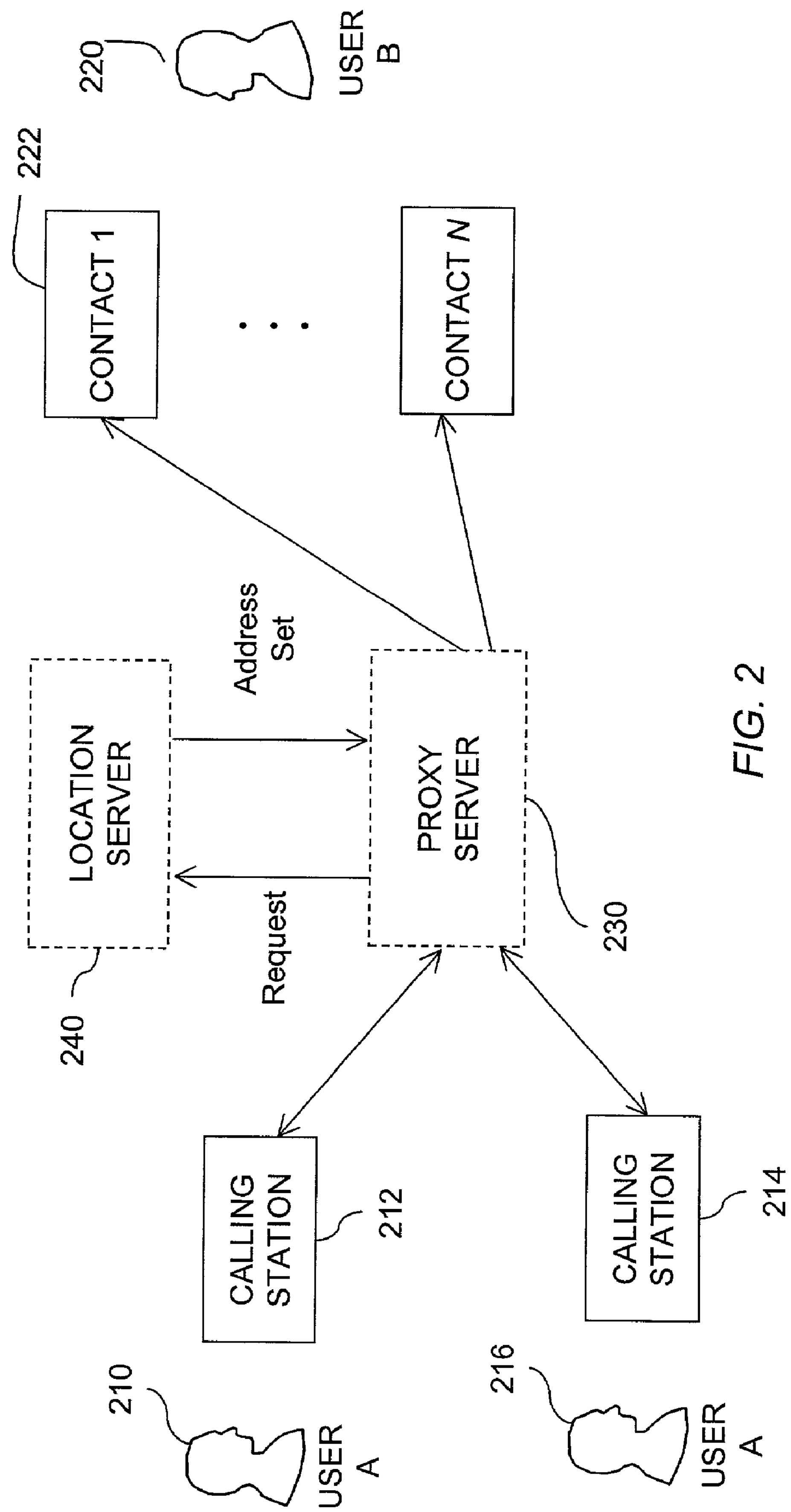
FIG. 2 is a diagram of functional elements involved in establishing a session among parties according to an exemplary embodiment of the present invention.

FIG. 2 is a diagram depicting the typical interaction of basic elements to establish a session by using the SIP protocol. Communications among these elements will typically take place through a common packet data network such as packet network 101 in FIG. 1.

In FIG. 2, User A 210 desires to establish communications with User B 220. User B 220 may be reachable at any one of several addresses. These addresses or contacts may correspond to conventional telephones, IP phones, wireless phones, pagers, etc. The list of addresses may even be changing as User B moves about and registers as being present at various terminal devices 222. The current information about User B's contact information is typically maintained in location server 240 or in a presence registry of some type not shown here.

To initiate contact, User A 210 accesses a terminal, calling station 212, and specifies User B as the destination to be reached. This expression of the specific desired destination may take the form of dialing of digits or of selecting a user name or URL-style address from a list. In some cases, User A may also be able to express what type of session is desired (video, high quality, messaging, etc.) or specify a desired quality level for the session. Once the request is specified at station 212, a SIP "INVITE" message describing the request is composed and sent to proxy server 230.

Proxy server 230 typically forwards a request to location server 240 to retrieve one or more contacts at which User B might be reached. As described earlier, proxy server 230 consults location server 240 for a variety of purposes, such as invoking profile-controlled feature behavior and obtaining the latest known location information pertaining to User B.

Location server 240 analyzes the request and responds to proxy server 230 in one of several possible ways. Location server 240 may disallow the session if User A is not permitted to contact User B, if User B's address cannot be recognized, or if User B has a feature activated that renders User B unreachable by User A.

Location server 240 may determine that User A is allowed to contact User B and may even find multiple addresses at which User B may be reachable. If this is the case, location server 240 returns a SIP "300 Multiple Choices" message containing a list of the contacts to be tried.

Upon receiving such a response, proxy server 230 then commences trying the contacts to see if User B can successfully be reached at any of the corresponding terminals 222. This "Find-Me" functionality is usually carried out in sequence starting with the most recent registered location or following a specific order as provisioned for User B (phone then pager). In some configurations, it is conceivable that proxy server 230 may attempt all contacts in parallel. An attempt to establish contact with a terminal 222 involves sending a SIP "INVITE" to the terminal and waiting for a reply indicative of success or failure.

In FIG. 2, User B 220 is shown to have two aliases, namely "5551234" and "user.b@ourcompany.com". User A 210 may identify User B 220 by "5551234" whereas another User C 216 calling from station 214 may reach User B 220 by referring to "user.b@ourcompany.com." In accordance with the present disclosure, both of these alternative references would reach User B 220.

Figure 3:
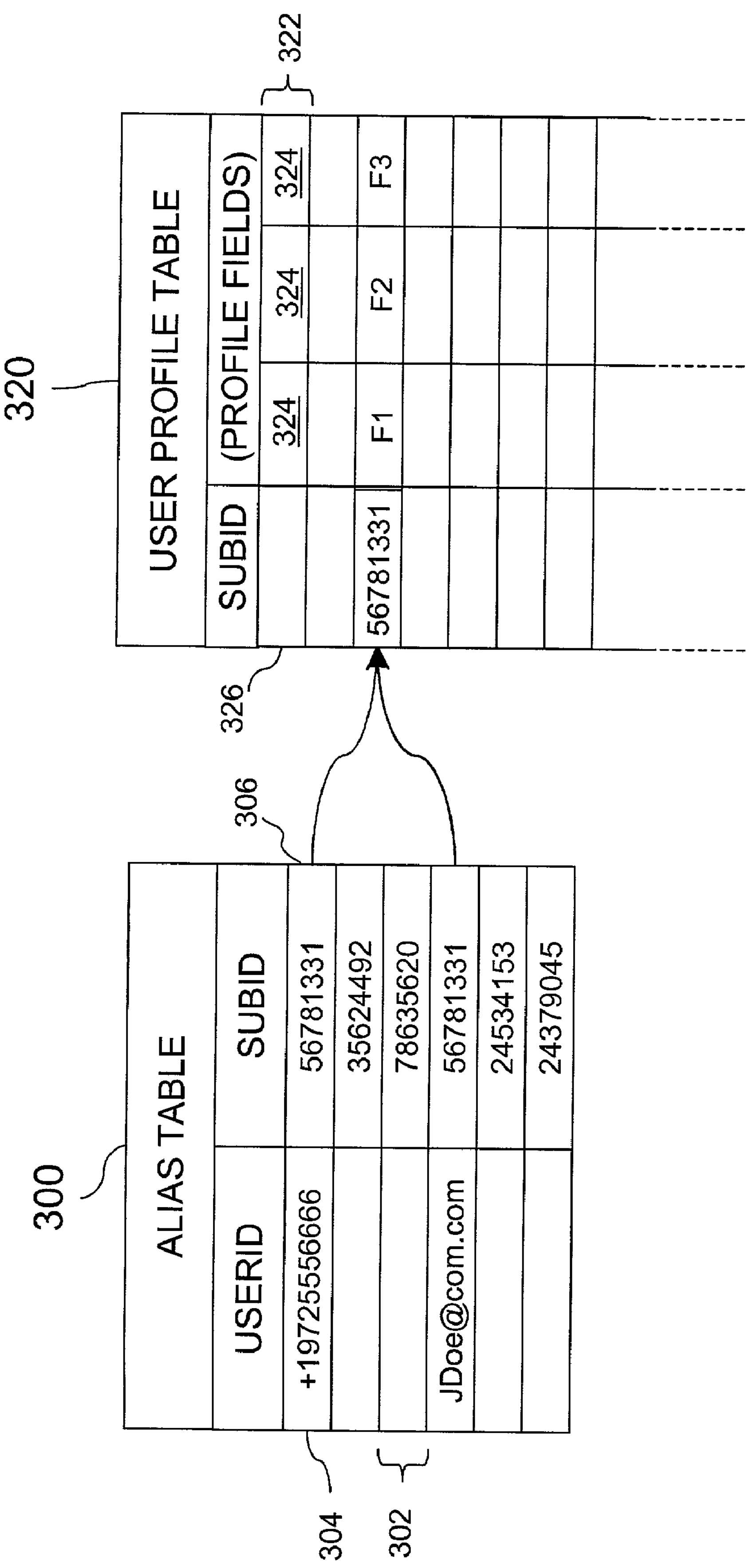
FIG. 3 is a diagram of data structures for implementing multiple aliases for a user profile in accordance with an exemplary embodiment of the present invention.

FIG. 3 depicts a manner in which alias information may be stored and applied in system 100. Alias table 300 is shown to comprise alias mapping records. Each mapping record 302 further comprises a USERID field 304 and a Subscriber ID (SUBID) field 306. Alias Table 300 serves to map each USERID value contained therein to a cooresponding SUBID value. USERIDs are required to be unique within alias table 300. SUBID values do not have to be unique because multiple aliases are permissible in system 100. These USERID and SUBID values may be set by provisioning activities through OSS 121 or may be user configured through a web-based interface or a SIP phone, for example.

User Profile Table 320 is shown to comprise user profile records 322. Each user profile record provides a set of values 324 that control service processing. Various ones of these values may be set by provisioning activities through OSS 121 or may be user configured through a web-based interface or a SIP phone, for example. Some values may provide indices to yet other tables, such as a listing of currently registered locations for the user.

Each record in User Profile Table 320 represents a unique user profile within system 100, and generally corresponds to an individual user. The SUBIDs in User Profile Table 320 have to be unique. As those of ordinary skill in the art will appreciate, a SUBID may be derived from, for example, the combination of a unique dial plan identifier along with a listing identifier that is unique within that dial plan.

A dialing plan ID is a function of a particular enterprise customer having a VPN with its own dialing plan. The dialing plan ID ensures that multiple VPNs can coexist and be adequately differentiated in system 100. For example, an originator dialing extension "2665205" in a private network belonging to Company A should reach the intended destination within Company A, even if Company B sharing the same system 100 happens to also have a "2665205" location in its private numbering plan.

Generally, a session request identifying a party by an alias is handled in the following manner. The alias provided in the request is compared to values in the USERID field of Alias Table 300. If a record is found wherein the USERID matches the requested party identifier, then the SUBID from the record is then used as an index to retrieve a particular profile from User Profile Table 320.

Note that, in the example of FIG. 3, both the first and fourth records shown in Alias Table 300 have the same SUBID value. Consequently, both of the USERIDs "+19725556666" and "JDoe@com.com" map to the same user profile represented by the third record in the User Profile Table 320. Thus, the indicated user profile has two aliases in this example. The values in Alias Table 300 and User Profile Table 320 may be maintained by, or be accessible to, location server 115 in system 100.

FIG. 4 describes a process 400 by which system 100 may support multiple aliases for a given user. In particular, in accordance with a preferred exemplary embodiment, process 400 is performed within location server 115, although those of ordinary skill in the art will recognize that there may be other arrangements for similarly supporting aliases in the system.

The process commences in step 402, upon the receipt of a routing request from proxy server 113 or the like. As described earlier, this request is usually in response to an originating party attempting to initiate a session. In step 404, the destination USERID is extracted from the routing request. The routing request will usually comprise a number of fields and may need to be parsed to obtain the destination field. For example, a routing request may resemble a SIP-style "INVITE" message, with the intended destination expressed in the Request-URI portion of the message.

In step 406, alias table 300 is searched to determine if the USERID derived in step 404 happens to match any of the USERID entries in the table. If so, then process 400 continues at step 408 with use of alias table 300 to map the particular USERID 302 as an index to a SUBID 304 or subscriber ID.

In step 410, the particular SUBID 304 is then used as an index into User Profile Table 320. From the user profile table may be obtained any number of parameters and settings that affect service processing for the destination user. As stated before, it is understood that the SUBID may be any unique identifier, such as the concatenation of a dial plan ID and a unique number within that dial plan. SUBID may be a unique numerical value.

Step 412, performed next, refers to the first stage of validating and screening the call request (as represented by the routing request). In accordance with the profile accessed in step 410, it is determined whether the originator is allowed to initiate the session as requested. In step 414, the net effect of the screening is evaluated to decide whether the originator's session request can be honored. If not, then processing jumps to step 424, wherein a "Request denied" response, or the like, is sent back to the proxy that submitted the routing request and process 400 terminates at step 420.

If, on the other hand, in step 414, the request is deemed acceptable, processing continues to step 416, in which further feature processing takes place according to the profile obtained in step 410. This may comprise call forwarding, find-me functionality, and retrieval of recently registered locations for the destination party. As is well known to those of skill in the art, the processing of these features is either well known or may be done in such a variety of ways without affecting the present teachings that it is unnecessary to provide detailed explanation herein. The result may be a list of contacts for reaching the destination party.

In step 418, the results of the feature processing of step 416 are sent to the proxy in the customary fashion. As is well known, the actual message sent back to the proxy may be differentiated based upon the number of contacts or some other characteristics of the results. After this response is sent, process 400 then terminates at step 420.

Returning to step 406, if the USERID is not found in the Alias Table, then processing proceeds to step 422 wherein the determination of whether to allow or disallow the call depends on other factors outside the scope of the present teachings. For example, this allows for the appropriate handling of calls placed to PSTN numbers beyond system 100.

Figure 5:
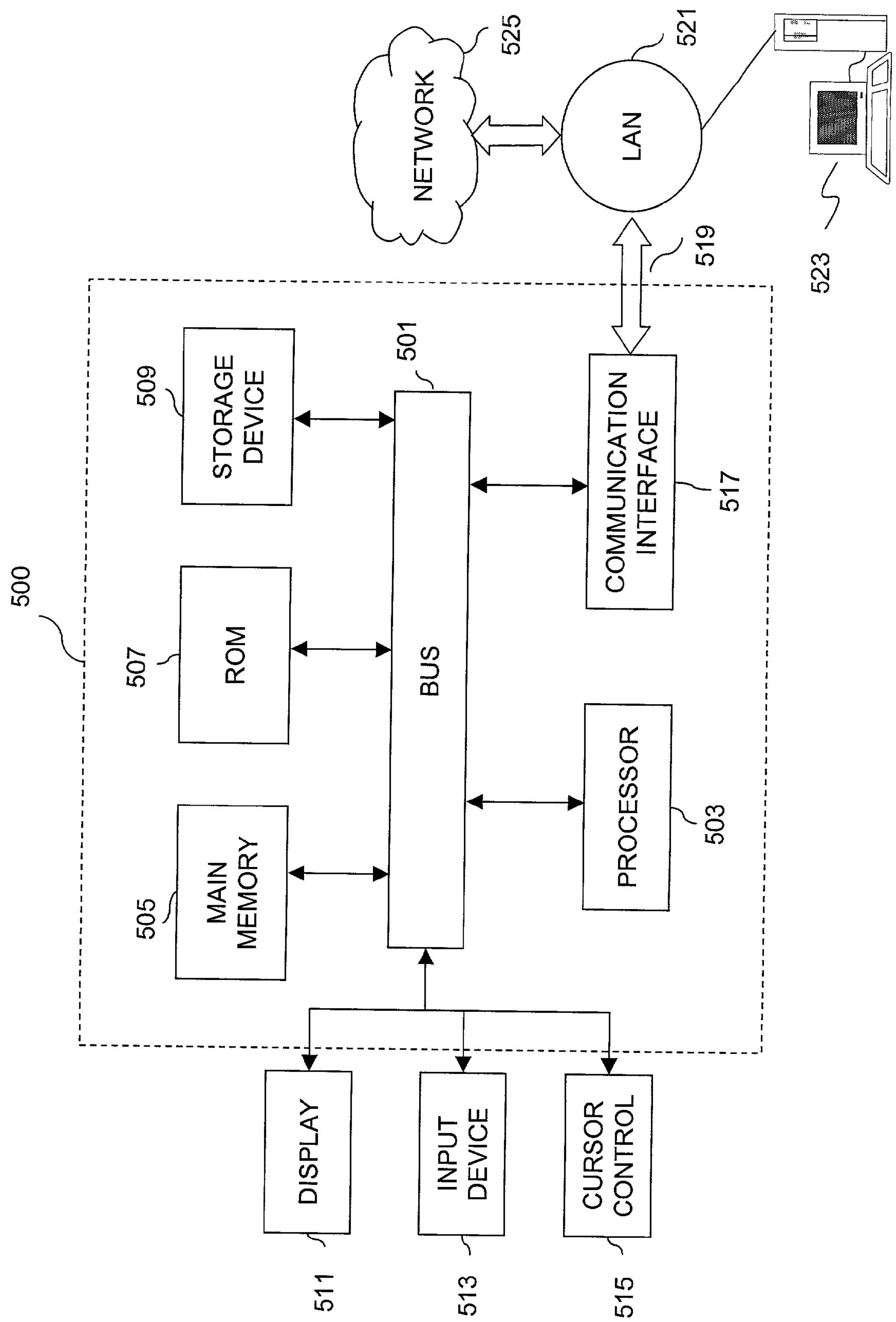
FIG. 5 is a diagram of a computer system that may be used to implement an embodiment of the present invention.

FIG. 5 illustrates a computer system 500 within which an embodiment according to the present invention can be implemented. The computer system 500 includes a bus 501 or other communication mechanism for communicating information, and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions to be executed by the processor 503. The computer system 500 further includes a read only memory (ROM) 507 or other static storage device coupled to the bus 501 for storing static information and instructions for the processor 503. A storage device 509, such as a magnetic disk or optical disk, is additionally coupled to the bus 501 for storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is cursor control 515, such as a mouse, a trackball, or cursor direction keys for communicating direction information and command selections to the processor 503 and for controlling cursor movement on the display 511.

According to one embodiment of the invention, the SIP server functionalities are provided by the computer system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, or a telephone modem to provide a data communication connection to a corresponding type of telephone line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although only a single communication interface 517 is shown, it is recognized that multiple communication interfaces may be employed to communicate with different networks and devices.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by service provider. The local network 521 and network 525 both use electrical, electromagnetic, or optical signals to convey information and instructions. The signals through the various networks and the signals on network link 519 and through communication interface 517, which communicate digital data with computer system 500, are exemplary forms of carrier waves bearing the information and instructions.

The computer system 500 can send messages and receive data, including program code, through the networks, network link 519, and communication interface 517. In the Internet example, a server (not shown) might transmit requested code belonging an application program for implementing an embodiment of the present invention through the network 525, local network 521 and communication interface 517. The processor 504 may execute the transmitted code while being received and/or store the code in storage device 509, or other non-volatile storage for later execution. In this manner, computer system 500 may obtain application code in the form of a carrier wave.

The term "computer-readable medium" as used herein refers to any medium that participates in providing instructions to the processor 504 for execution. Such a medium may take many forms, including but not limited to non-volatile media, volatile media, and transmission media. Non-volatile media include, for example, optical or magnetic disks, such as storage device 509. Volatile media include dynamic memory, such as main memory 505. Transmission media include coaxial cables, copper wire and fiber optics, including the wires that comprise bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While the present invention has been described in connection with a number of embodiments and implementations by way of example, the present invention is not limited to such embodiments. Those of ordinary skill in the art will recognize that many implementations are possible within the spirit and scope of the invention as may be construed from the following claims.

What is claimed is:

1. In a communications system, a method for controlling the establishment of a communication session with a party comprising:

receiving a first user identification symbol specifying the party, the party being associated with at least one second user identification symbol, the at least one second user identification symbol being different than the first user identification symbol;

mapping the first user identification symbol to an index identifying user profile information corresponding to the party;

using the index, accessing the user profile information;

specifying a period of time for enabling the first user identification symbol to be used for communication sessions, specifying the first user identification symbol, with the party;

enabling the establishment of the communication session, specifying the first user identification symbol, as a function of the user profile information corresponding to the party, during the period of time; and disabling the establishment of another communication session, specifying the first user identification symbol, with the party, after an expiration of the period of time, communication sessions continuing to be enabled for the at least one second user identification symbol.

2. The method of claim 1 further comprising:

receiving the at least one second user identification symbol; and determining that the at least one second user identification symbol maps to the same index as the first user identification symbol.

3. The method of claim 1 where the mapping is performed by consulting a list that indicates the first user identification symbol as being associated with the index.

4. The method of claim 3 further comprising:

providing at least one entry in the list to establish the relationship of the first user identification symbol with the index.

5. The method of claim 1, where the disabling comprises:

mapping, after the expiration of the period of time, the first user identification symbol to an index identifying another user profile information.

6. The method of claim 1, further comprising:

specifying a purpose for the first user identification symbol; and establishing, based on the specified purpose, a communication session, specifying the first user identification symbol, with the party according a first communication handling procedure.

* * * * *